US007881817B2

(12) United States Patent
Pang et al.

(10) Patent No.: US 7,881,817 B2
(45) Date of Patent: Feb. 1, 2011

(54) METHOD AND APPARATUS FOR PROCESSING AN AUDIO SIGNAL

(75) Inventors: Hee Suk Pang, Seoul (KR); Dong Soo Kim, Seoul (KR); Jae Hyun Lim, Seoul (KR); Hyen-O Oh, Gyeonggi-do (KR); Yang-Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/280,309

(22) PCT Filed: Feb. 16, 2007

(86) PCT No.: PCT/KR2007/000866

§ 371 (c)(1),
(2), (4) Date: Mar. 16, 2009

(87) PCT Pub. No.: WO2007/097550

PCT Pub. Date: Aug. 30, 2007

(65) Prior Publication Data

US 2009/0240504 A1 Sep. 24, 2009

Related U.S. Application Data

(60) Provisional application No. 60/803,825, filed on Jun. 2, 2006, provisional application No. 60/791,907, filed on Apr. 14, 2006, provisional application No. 60/775,775, filed on Feb. 23, 2006.

(51) Int. Cl.
*G06F 17/00* (2006.01)

(52) U.S. Cl. ............................................ 700/94; 381/1

(58) Field of Classification Search .................. 700/94; 386/95, 96, 97, 98, 99, 104

See application file for complete search history.

(56) References Cited

U.S. PATENT DOCUMENTS 5,166,685 A 11/1992 Campbell et al.
5,524,054 A 6/1996 Spille et al.
5,579,396 A 11/1996 Iida et al.

(Continued)

FOREIGN PATENT DOCUMENTS

EP 1315148 A1 5/2003

(Continued)

OTHER PUBLICATIONS

Non-final Office Action in U.S. Appl. No. 12/280,313, mailed Dec. 11, 2009, 21 pages.

(Continued)

*Primary Examiner*—Walter F Briney, III
(74) *Attorney, Agent, or Firm*—Fish & Richardson P.C.

(57) ABSTRACT

A method for processing an audio signal, comprising the steps of extracting an ancillary signal for generating the audio signal and an extension signal included in the ancillary signal from a received bit stream, reading length information for the extension signal, skipping decoding of the extension signal or not using a result of the decoding based on the length information, and generating the audio signal using the ancillary signal. Accordingly, in case of processing the audio signal by the present invention, it is able to reduce a corresponding load of operation to enable efficient processing and enhance a sound quality.

10 Claims, 12 Drawing Sheets

U.S. PATENT DOCUMENTS

| | | | | |
|---|---|---|---|---|
| 5,632,005 | A | 5/1997 | Davis et al. | |
| 5,703,584 | A | 12/1997 | Hill et al. | |
| 6,118,875 | A | 9/2000 | Moller et al. | |
| 6,307,941 | B1 | 10/2001 | Tanner et al. | |
| 6,356,639 | B1 | 3/2002 | Ishito et al. | |
| 6,574,339 | B1 | 6/2003 | Kim | |
| 6,611,293 | B2 | 8/2003 | Tarnoff et al. | |
| 6,711,266 | B1 | 3/2004 | Aylward et al. | |
| 6,973,130 | B1 | 12/2005 | Wee et al. | |
| 7,555,434 | B2 | 6/2009 | Nomura et al. | |
| 2003/0093264 | A1 * | 5/2003 | Miyasaka et al. | 704/205 |
| 2003/0167370 | A1 | 9/2003 | Deoka et al. | |
| 2003/0236583 | A1 | 12/2003 | Baumgarte et al. | |
| 2004/0071445 | A1 | 4/2004 | Tarnoff et al. | |
| 2004/0196770 | A1 | 10/2004 | Touyama et al. | |
| 2005/0074127 | A1 | 4/2005 | Herre et al. | |
| 2005/0157883 | A1 | 7/2005 | Herre et al. | |
| 2005/0180579 | A1 | 8/2005 | Baumgarte | |
| 2005/0195981 | A1 | 9/2005 | Faller et al. | |
| 2006/0101484 | A1 | 5/2006 | Masumoto et al. | |
| 2006/0115100 | A1 | 6/2006 | Faller et al. | |
| 2006/0133618 | A1 | 6/2006 | Villemoes et al. | |
| 2006/0153408 | A1 | 7/2006 | Faller et al. | |
| 2006/0190247 | A1 * | 8/2006 | Lindblom | 704/230 |

FOREIGN PATENT DOCUMENTS

| | | | |
|---|---|---|---|
| EP | 1396843 | A1 | 3/2004 |
| EP | 1455345 | | 9/2004 |
| EP | 1617413 | A2 | 1/2006 |
| JP | 8-202397 | A | 8/1996 |
| JP | 09-275544 | | 10/1997 |
| JP | 2001-188578 | | 7/2001 |
| JP | 2004/23481 | A | 1/2004 |
| JP | 2004-64363 | A | 2/2004 |
| JP | 08-065169 | | 3/2008 |
| JP | 08-202397 | | 9/2008 |
| KR | 10-2001-0001993 | | 1/2001 |
| KR | 10-2001-0009258 | | 2/2001 |
| RU | 2119259 | | 9/1998 |
| RU | 2129336 | | 4/1999 |
| RU | 2158970 | C2 | 11/2000 |
| TW | 289885 | | 11/1996 |
| TW | 405328 | A | 9/2000 |
| TW | 550541 | | 9/2003 |
| TW | 200304120 | | 9/2003 |
| TW | 200402689 | A | 2/2004 |
| TW | 200405673 | | 4/2004 |
| TW | 594675 | | 6/2004 |
| TW | I225639 | A | 12/2004 |
| TW | 200605519 | A | 2/2006 |
| WO | 9949574 | | 9/1999 |
| WO | WO 03/007656 | | 1/2003 |
| WO | 03-090208 | | 10/2003 |
| WO | WO03/090207 | A1 | 10/2003 |
| WO | 2004-008805 | | 1/2004 |
| WO | 2004-019656 | | 3/2004 |
| WO | 2004-036549 | | 4/2004 |
| WO | 2004-036954 | | 4/2004 |
| WO | 2004-036955 | | 4/2004 |
| WO | 2004036548 | | 4/2004 |
| WO | WO2004/080125 | A1 | 9/2004 |
| WO | 2005/098821 | A2 | 10/2005 |

OTHER PUBLICATIONS

Non-final Office Action in U.S. Appl. No. 12/280,323, mailed Dec. 14, 2009, 20 pages.

European Search Report in Application No. 07709015.7 dated Feb. 2, 2010, 4 pages.

Schroeder E F et al, 'Der MPEG-2-Standard: Generische Codierung Fuer Bewegtbilder Und Zugehoerige Audio-Information. Audio-Coiderung (Teil 4)' Fkt Fernseh Unde Kinotechnik, Fachverlag Schiele & Schon GMBH, Berlin, DE, vol. 4, No. 7/08, Aug. 30, 1994, pp. 364-368, 370, XP000460964.

Breebaart, et al.: "Multi-Channel Goes Mobile: MPEG Surround Binaural Rendering" In: Audio Engineering Society the 29th International Conference, Seoul, Sep. 2-4, 2006, pp. 1-13. See the abstract, pp. 1-4, figures 5,6.

Breebaart, J., et al.: "MPEG Spatial Audio Coding/MPEG Surround: Overview and Current Status" In: Audio Engineering Society the 119th Convention, New York, Oct. 7-10, 2005, pp. 1-17. See pp. 4-6.

Faller, C., et al.: "Binaural Cue Coding—Part II: Schemes and Applications", IEEE Transactions on Speech and Audio Processing, vol. 11, No. 6, 2003, 12 pages.

Faller, C.: "Coding of Spatial Audio Compatible with Different Playback Formats", Audio Engineering Society Convention Paper, Presented at 117th Convention, Oct. 28-31, 2004, San Francisco, CA.

Faller, C.: "Parametric Coding of Spatial Audio", Proc. of the 7th Int. Conference on Digital Audio Effects, Naples, Italy, 2004, 6 pages.

Herre, J., et al.: "Spatial Audio Coding: Next generation efficient and compatible coding of multi-channel audio", Audio Engineering Society Convention Paper, San Francisco, CA , 2004, 13 pages.

Herre, J., et al.: "The Reference Model Architecture for MPEG Spatial Audio Coding", Audio Engineering Society Convention Paper 6447, 2005, Barcelona, Spain, 13 pages.

International Search Report in International Application No. PCT/KR2006/000345, dated Apr. 19, 2007, 1 page.

International Search Report in International Application No. PCT/KR2006/000346, dated Apr. 18, 2007, 1 page.

International Search Report in International Application No. PCT/KR2006/000347, dated Apr. 17, 2007, 1 page.

International Search Report in International Application No. PCT/KR2006/000866, dated Apr. 30, 2007, 1 page.

International Search Report in International Application No. PCT/KR2006/000867, dated Apr. 30, 2007, 1 page.

International Search Report in International Application No. PCT/KR2006/000868, dated Apr. 30, 2007, 1 page.

International Search Report in International Application No. PCT/KR2006/001987, dated Nov. 24, 2006, 2 pages.

International Search Report in International Application No. PCT/KR2006/002016, dated Oct. 16, 2006, 2 pages.

International Search Report in International Application No. PCT/KR2006/003659, dated Jan. 9, 2007, 1 page.

International Search Report in International Application No. PCT/KR2006/003661, dated Jan. 11, 2007, 1 page.

International Search Report in International Application No. PCT/KR2007/000340, dated May 4, 2007, 1 page.

International Search Report in International Application No. PCT/KR2007/000668, dated Jun. 11, 2007, 2 pages.

International Search Report in International Application No. PCT/KR2007/000672, dated Jun. 11, 2007, 1 page.

International Search Report in International Application No. PCT/KR2007/000675, dated Jun. 8, 2007, 1 page.

International Search Report in International Application No. PCT/KR2007/000676, dated Jun. 8, 2007, 1 page.

International Search Report in International Application No. PCT/KR2007/000730, dated Jun. 12, 2007, 1 page.

International Search Report in International Application No. PCT/KR2007/001560, dated Jul. 20, 2007, 1 page.

International Search Report in International Application No. PCT/KR2007/001602, dated Jul. 23, 2007, 1 page.

Scheirer, E. D., et al.: "AudioBIFS: Describing Audio Scenes with the MPEG-4 Multimedia Standard", IEEE Transactions on Multimedia, Sep. 1999, vol. 1, No. 3, pp. 237-250. See the abstract.

Vannanen, Riitta, "User Interaction and Authoring of 3D Sound Scenes in the Carrouso EU project", Audio Engineering Society Convention Paper 5764, Amsterdam, The Netherlands, 2003, 9 pages.

International Search Report in corresponding PCT Application No. PCT/KR2006/001986, dated Dec. 21,2006, 4 pages.

Taiwan Patent Office Action in Taiwanese patent application 096102410, dated Jul. 2, 2009, 5 pages.

Russian Notice of Allowance for Application No. 2008114388, dated Aug. 24, 2009, 13 pages.

Taiwanese Office Action for Application No. 96104544, dated Oct. 9, 2009, 13 pages.
Taiwanese Office Action for Application No. 096106320, dated Apr. 22, 2010, 6 pages.
European Search Report (Appln. No. 07709014.0) dated Feb. 26, 2010, 6 pages, in English.
Taiwanese Office Action (Appln No. 096106318) dated Feb. 2, 2010, 8 pages, English Translation.
U.S. Interview Summary in U.S. Appl. No. 12/280,313 mailed Sep. 17, 2010, 3 pages.
U.S. Final Office Action in U.S. Appl. No. 12/280,323 mailed Jun. 11, 2010, 21 pages.
U.S. Final Office Action in U.S. Appl. No. 12/280,313 mailed Jun. 14, 2010, 19 pages.

* cited by examiner

| | |
|---|---|
| bsResidualSignalLength | 16 bits |

bsResidualSignalLength defines the number of bytes for residual bitstreams

| | |
|---|---|
| bsResidualSignalLengthType | 2 bits |
| bsResidualSignalLength | 4 bits if bsResidualSignalLengthType =0<br>8 bits if bsResidualSignalLengthType =1<br>12 bits if bsResidualSignalLengthType =2<br>16 bits if bsResidualSignalLengthType =3 |
| bsResidualSignalLength | defines the number of bytes for residual bitstreams |

FIG. 7

```
Read 4 bits for bsResidualSignalLength
If(bsResidualSignalLength =(2^(4)-1)){
   Read 8 bits for bsResidualSignalLength1
   bsResidualSignalLength += bsResidualSignalLength1;
}
If(bsResidualSignalLength =((2^(4)-1) + (2^(8)-1)){
   Read 12 bits for bsResidualSignalLength2
   bsResidualSignalLength += bsResidualSignalLength2;
}
If(bsResidualSignalLength =((2^(4)-1) + (2^(8)-1) + (2^(12)-1)){
   Read 16 bits for bsResidualSignalLength3
   bsResidualSignalLength += bsResidualSignalLength3;
}
```

METHOD AND APPARATUS FOR PROCESSING AN AUDIO SIGNAL

TECHNICAL FIELD

The present invention relates to a method and apparatus for processing an audio signal. Although the present invention is suitable for a wide scope of applications, it is particularly suitable for processing a residual signal.

BACKGROUND ART

Generally, an audio signal includes a downmix signal and an ancillary data signal. And, the ancillary data signal can include a spatial information signal and an extension signal. In this case, the extension signal means an additional signal necessary to enable a signal to be reconstructed close to an original signal in generating a multi-channel signal by upmixing the downmix signal. For instance, the extension signal can include a residual signal. The residual signal means a signal corresponding to a difference between an original signal and a coded signal. In multi-channel audio coding, the residual signal is usable for the following cases. For instance, the residual signal is usable for compensation of an artistic downmix signal or specific channel compensation in decoding. And, the residual signal is usable for both of the compensations as well. So, it is able to reconstruct an inputted audio signal into a signal closer to an original signal using the residual signal to enhance sound quality.

DISCLOSURE OF THE INVENTION

Technical Problem

However, if a decoder performs decoding on an extension signal unconditionally, although a sound quality may be improved according to a type of the decoder, complexity is raised and an operational load is increased.

Moreover, since header information for an audio signal is not variable in general, the header information is inserted in a bit stream once only. But in case that the header information is inserted in the bit stream once only, if an audio signal needs to be decoded from a random timing point for broadcasting or VOD, it may be unable to decode data frame information due to the absence of the header information.

Technical Solution

Accordingly, the present invention is directed to a method and apparatus for processing an audio signal that substantially obviate one or more of the problems due to limitations and disadvantages of the related art.

An object of the present invention is to provide a method and apparatus for processing an audio signal, by which a processing efficiency of the audio signal is enhanced by skipping decoding of an extension signal.

Another object of the present invention is to provide a method and apparatus for processing an audio signal, by which decoding of an extension signal is skipped using length information of the extension signal.

Another object of the present invention is to provide a method and apparatus for processing an audio signal, by which an audio signal for broadcasting is reproducible from a random timing point.

A further object of the present invention is to provide a method and apparatus for processing an audio signal, by which the audio signal is processed according to level information.

Advantageous Effects

The present invention provides the following effects or advantages.

First of all, in case of performing decoding, the present invention selectively decodes an extension signal to enable more efficient decoding. In case of performing decoding on an extension signal, the present invention is able to enhance a sound quality of an audio signal. In case of not performing decoding on an extension signal, the present invention is able to reduce complexity. Moreover, even if decoding is performed on an extension signal, the present invention is able to enhance a sound quality by decoding a predetermined low frequency part only and also reduce a load of operation. Besides, in case of using an audio signal for broadcasting or the like, the present invention is able to process an audio signal from a random timing point in a manner of identifying a presence or non-presence of header information within the audio signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 and FIG. 8 are diagrams to explain adaptive bits assignment of length information for an extension signal by depending on a real length of the extension signal according to an embodiment of the present invention;

BEST MODE FOR CARRYING OUT THE INVENTION

Figure 1:
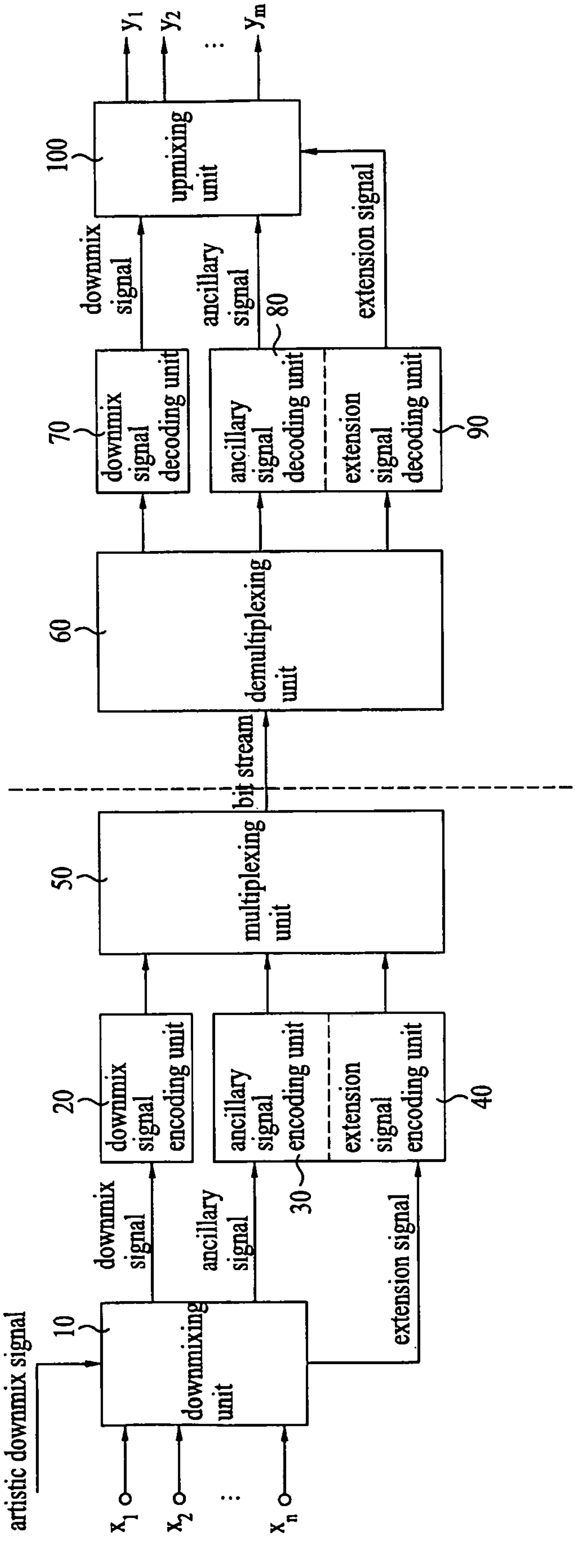
FIG. 1 is a block diagram of an audio signal encoding apparatus and an audio signal decoding apparatus according to an embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for processing an audio signal according to the present invention includes the steps of extracting an ancillary signal for generating the audio signal and an extension signal included in the ancillary signal from a received bit stream, reading length information of the extension signal, skipping decoding of the extension signal or not using a result of the decoding based on the length information, and generating the audio signal using the ancillary signal.

To further achieve these and other advantages and in accordance with the purpose of the present invention, a method for processing an audio signal includes the steps of acquiring sync information indicating a location of an ancillary signal for generating the audio signal and a location of an extension signal included in the ancillary signal, skipping decoding of the extension signal or not using a result of the decoding based on the sync information, and generating the audio signal using the ancillary signal.

To further achieve these and other advantages and in accordance with the purpose of the present invention, an apparatus for processing an audio signal includes a signal extracting unit extracting an ancillary signal for generating the audio signal and an extension signal included in the ancillary signal from a received bit stream, an extension signal length reading unit reading length information of the extension signal, a selective decoding unit skipping decoding of the extension signal or not using a result of the decoding based on the length information, and an upmixing unit generating the audio signal using the ancillary signal.

To further achieve these and other advantages and in accordance with the purpose of the present invention, an apparatus for processing an audio signal includes a sync information acquiring unit acquiring sync information indicating a location of an ancillary signal for generating the audio signal and a location of an extension signal included in the ancillary signal, a selective decoding unit skipping decoding of the extension signal or not using a result of the decoding based on the sync information, and an upmixing unit generating the audio signal using the ancillary signal.

It is to be understood that both the foregoing general description and the following detailed description are exemplary and explanatory and are intended to provide further explanation of the invention as claimed.

Mode for Invention

Reference will now be made in detail to the preferred embodiments of the present invention, examples of which are illustrated in the accompanying drawings.

FIG. 1 is a block diagram of an audio signal encoding apparatus and an audio signal decoding apparatus according to an embodiment of the present invention.

Referring to FIG. 1, an encoding apparatus includes a downmixing unit 10, a downmix signal encoding unit 20, an ancillary signal encoding unit 30, an extension signal encoding unit 40, and a multiplexing unit 50.

In case that multi-source audio signals X1, X2, . . . , Xn are inputted to the downmixing unit 10, the downmixing unit 10 generates a downmix signal by downmixing the multi-source audio signals. The downmix signal includes a mono signal, a stereo signal, or a multi-source audio signal. The source includes a channel and is described as the channel for convenience. In the specification of the present invention, explanation is made with reference to a mono or stereo downmix signal. Yet, the present invention is not limited to the mono or stereo downmix signal. The encoding apparatus is able to use an artistic downmix signal provided from an outside selectively and directly. In the course of downmixing, an ancillary signal can be generated from a multi-channel audio signal and an extension signal corresponding to additional information can be generated as well. In this case, the ancillary signal can include a spatial information signal and an extension signal. The generated downmix, ancillary and extension signals are encoded by the downmix signal encoding unit 20, the ancillary signal encoding unit 30, and the extension signal encoding unit 40 and are then transferred to the multiplexing unit 50, respectively.

In the present invention, the 'spatial information' means the information necessary for the encoding apparatus to transfer a downmix signal generated from downmixing multi-channel signals to the decoding apparatus and necessary for the decoding apparatus to generate multi-channel signals by upmixing the downmix signal. The spatial information includes spatial parameters. The spatial parameters include CLD (channel level difference) indicating an energy difference between channels, ICC (inter-channel coherences) meaning a correlation between channels, CPC (channel prediction coefficients) used in generating three channels from two channels, etc. And, the 'extension signal' means additional information necessary to enable a signal to be reconstructed closer to an original signal in generating multi-channel signals by upmixing the downmix signal by the decoding apparatus. For instance, the additional information includes a residual signal, an artistic downmix residual signal, an artistic tree extension signal, etc. In this case, the residual signal indicates a signal corresponding to a difference between an original signal and an encoded signal. In the following description, it is assumed that the residual signal includes a general residual signal or an artistic downmix residual signal for compensation of an artistic downmix signal.

In the present invention, the downmix signal encoding unit 20 or the downmix signal decoding unit 70 means a codec that encodes or decodes an audio signal not included with an ancillary signal. In the present specification, a downmix audio signal is taken as an example of not included with the ancillary signal the audio signal. And, the downmix signal encoding unit 20 or the downmix signal decoding unit 70 is able to include MP3, AC-3, DTS, or AAC. If a codec function is performed on an audio signal, the downmix signal encoding unit 20 and the downmix signal decoding unit 70 can include a codec to be developed in the future as well as a previously developed codec.

The multiplexing unit 50 can generate a bit stream by multiplexing a downmix signal, an ancillary signal, and an extension signal and then transfer the generated bit stream to the decoding apparatus. In this case, both of the downmix signal and the ancillary signal can be transferred in a bit stream format to the decoding apparatus. Alternatively, the ancillary signal and the downmix signal can be transferred in independent bit stream formats to the decoding apparatus, respectively. Details of the bit streams are explained in FIGS. 9 to 11.

In case that it is unable to use previously transferred header information since an audio signal starts to be decoded from a random timing point instead of being decoded from the beginning like a bit stream for broadcasting, it is able to decode the audio signal using another header information inserted in the audio signal. In case of header information is lost in the course of transferring an audio signal, decoding should start from any timing point of receiving a signal. So, header information can be inserted in an audio signal at least once. If header information exists in a front part of an audio signal only once, it is unable to perform decoding due to the absence of the header information in case of receiving an audio signal at a random timing point. In this case, header information can be included according to a preset format (e.g., temporal interval, spatial interval, etc.). It is able to insert identification information indicating a presence or non-presence of header information in a bit stream. And, an audio signal is able to selectively include a header according to the identification information. For instance, an ancillary signal is able to selectively include a header according to the header identification information. Details of the bit stream structures are explained in FIGS. 9 to 12.

The decoding apparatus includes a demultiplexing unit 60, a downmix signal decoding unit 70, an ancillary signal decoding unit 80, an extension signal decoding unit 90, and an upmixing unit 100.

The demultiplexing unit 60 receives a bit stream and then separates an encoded downmix signal, an encoded ancillary signal, and an encoded extension signal from the received bit stream. The downmix signal decoding unit 70 decodes the encoded downmix signal. And, the ancillary signal decoding unit 80 decodes the encoded ancillary signal.

Meanwhile, the extension signal can be included in the ancillary signal. It is necessary to efficiently decode the extension signal to efficiently generate multi-channel audio signals. So, the extension signal decoding unit 90 is able to selectively decode the encoded extension signal. In particular, the encoded extension signal can be decoded or the decoding of the encoded extension signal can be skipped. Occasionally, if the decoding of the extension signal is skipped, the encoded signal can be reconstructed to be closer to an original signal and coding efficiency can be raised.

For instance, if a level of the decoding apparatus is lower than that of a bit stream, the decoding apparatus is unable to decode the received extension signal. So, the decoding of the extension signal can be skipped. Even if the decoding of the extension signal is available because the level of the decoding apparatus is higher than that of the bit stream, the decoding of the extension signal is able to be skipped by another information obtained from the audio signal. In this case, for instance, the another information may include information indicating whether to execute the decoding of the extension signal. This is explained in detail with reference to FIG. 14 later.

And for instance, in order to omit the decoding of the extension signal, length information of the extension signal is read from the bit stream and the decoding of the extension signal is able to be skipped using the length information. Alternatively, it is able to skip the decoding of the extension signal using sync information indicating a position of the extension signal. This is explained in detail with reference to FIG. 2 later.

The length information of the extension signal can be defined in various ways. For instance, fixed bits can be assigned, or variable bits can be assigned according to a predetermined length information type, or bits suitable for a length of a real extension signal can be adaptively assigned while the length of the extension signal is read. Details of the fixed bits assignment are explained in FIG. 3 and FIG. 4. Details of the variable bits assignment are explained in FIG. 5 and FIG. 6. And, details of the adaptive bits assignment are explained in FIG. 7 and FIG. 8.

The length information of the extension signal can be located within an ancillary data area. In this case, the ancillary data area indicates an area where additional information necessary to reconstruct a downmix signal into an original signal exists. For instance, a spatial information signal or an extension signal can be taken as an example of the ancillary data. So, the length information of the extension signal can be located within the ancillary signal or an extension area of the ancillary signal.

In particular, the length information of the extension signal is located within a header extension area of the ancillary signal, a frame data extension area of the ancillary signal, or both of the header extension area and the frame data extension area of the ancillary signal. These are explained in detail with reference to FIGS. 9 to 11 later.

Figure 2:
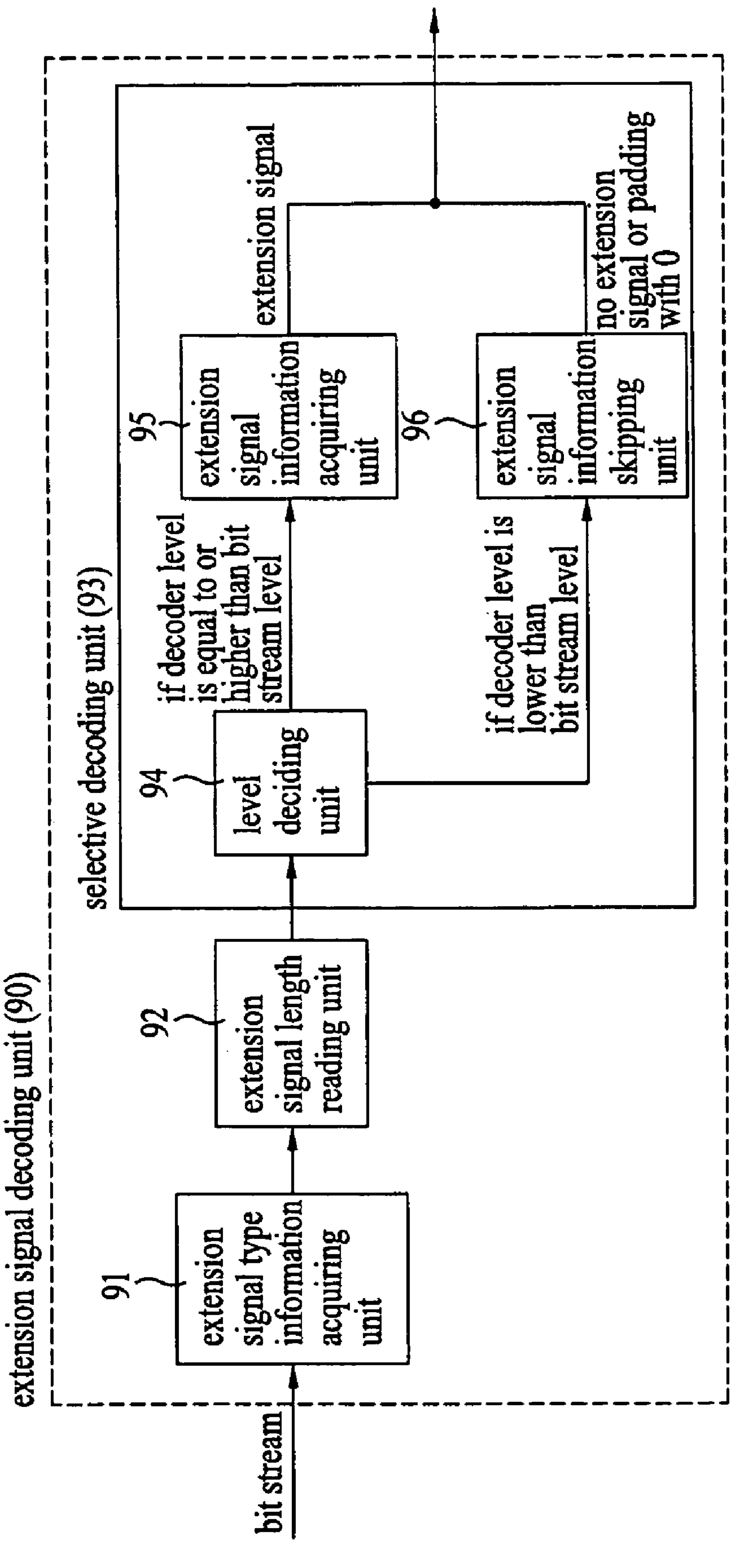
FIG. 2 is a schematic block diagram of an extension signal decoding unit 90 according to an embodiment of the present invention.

FIG. 2 is a schematic block diagram of an extension signal decoding unit 90 according to an embodiment of the present invention.

Referring to FIG. 2, the extension signal decoding unit 90 includes an extension signal type information acquiring unit 91, an extension signal length reading unit 92, and a selective decoding unit 93. And, the selective decoding unit 93 includes a level deciding unit 94, an extension signal information acquiring unit 95, and an extension signal information skipping unit 96. The extension signal decoding unit 90 receives a bit stream for an extension signal from the demultiplexing unit 60 and then outputs a decoded extension signal. Occasionally, the extension signal decoding unit 90 may not output an extension signal or can output an extension signal by padding a bit stream for the extension signal with zeros completely. For the case of not outputting an extension signal, a method of skipping the decoding of the extension signal is usable. The extension signal type acquiring unit 91 acquires information indicating a type of an extension signal from a bit stream. For instance, the information indicating the type of the extension signal can include a residual signal, an artistic downmix residual signal, an artistic tree extension signal, or the like. In the present invention, the residual signal is a generic term of a general residual signal or an artistic downmix residual signal for compensation of an artistic downmix signal. The residual signal is usable for compensation of an artistic downmix signal in multi-channel audio signals or specific channel compensation in decoding. Optionally, the two cases are usable as well. If the type of the extension signal is decided by the extension signal type information, the extension signal length reading unit 92 reads a length of the extension signal decided by the type information of the extension signal. This can be achieved regardless of whether to perform the decoding of the extension signal. Once the length of the extension signal is read, the selective decoding unit 93 selectively performs decoding on the extension signal. This can be decided by the level deciding unit 94. In particular, the level deciding unit 94 selects whether to execute the decoding of the extension signal by comparing a level of a bit stream to a level of a decoding apparatus. For instance, if the level of the decoding apparatus is equal to or higher than that of the bit stream, the decoding apparatus acquires information for the extension signal via the extension signal information acquiring unit 95 and then decodes the information to output the extension signal. The outputted extension signal is transferred to an upmixing unit 100 to be used in reconstruct an original signal or generating an audio signal. Yet, if the level of the decoding apparatus is lower than that of the bit stream, it is able to skip the decoding of the extension signal via the extension signal information skipping unit 96. In this case, it is able to skip the decoding of the extension signal based on the length information read by the extension signal length reading unit 92. Thus, in case that the extension signal is used, the reconstruction can be achieved to get closer to the original signal to enhance a sound quality. If necessary, it is able to reduce a load of operation of the decoding apparatus by omitting the decoding of the extension signal.

As an example of the method of omitting the decoding of the extension signal in the extension signal information skipping unit 96, in case of using the length information of the extension signal, bit or byte length information of the extension signal can be inserted in data. And, the decoding can keep proceeding by skipping a bit field of the extension signal as many as a value obtained from the length information. Methods of defining the length information of the extension signal shall be explained with reference to FIGS. 3 to 8.

As another example of the method of omitting the decoding of the extension signal, it is able to skip the decoding of the extension signal based on sync information indicating a position of the extension signal. For instance, it is able to insert a sync word having predetermined bits in the point where the extension signal ends. The decoding apparatus keeps searching the bit field of the residual signal until finding a sync word of the extension signal. Once finding the sync word, the decoding apparatus stops the search process and then keeps performing the decoding. In particular, it is able to skip the decoding of the extension signal until the sync word of the extension signal is found. As another example of a decoding method according to the selection, in case of performing the decoding of the extension signal, it is able to perform the decoding after parsing the extension signal. When the decoding of the extension signal is performed, the sync word of the extension signal is read but may not be available.

Figures 3, 4:
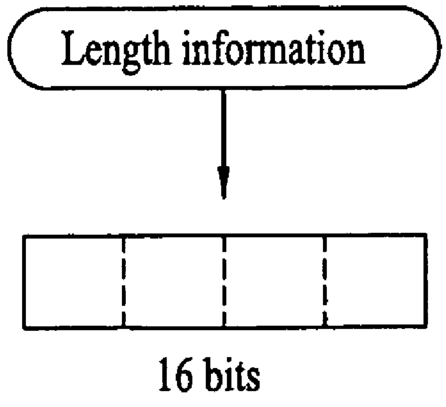
FIG. 3 and FIG. 4 are diagrams to explain fixed bits assignment of length information for an extension signal according to an embodiment of the present invention.

FIG. 3 and FIG. 4 are diagrams to explain fixed bits assignment of length information for an extension signal according to an embodiment of the present invention.

The length information of the extension signal can be defined by a bit or byte unit. If the length information is decided by the byte unit, this means that the extension signal is assigned bytes. FIG. 3 shows a method of defining length information for an extension signal in a simplest way. And, FIG. 4 shows the method shown in FIG. 3 schematically. A syntax element for indicating the length information of the extension signal is defined and predetermined bits are assigned to the syntax element. For instance, 'bsResidualSignalLength' is defined as the syntax element and 16 bits are assigned as fixed bits. Yet, this method may consume a relatively considerable amount of bits. So, the methods shown in FIG. 5, FIG. 6, FIG. 7, and FIG. 8 are explained as follows.

Figures 5, 6:
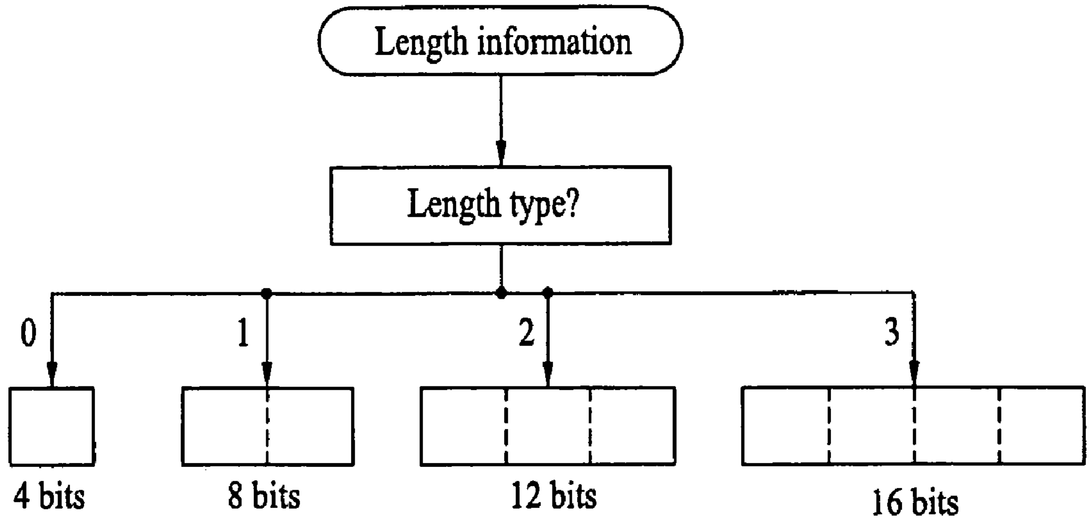
FIG. 5 and FIG. 6 are diagrams to explain variable bits assignment of length information for an extension signal by depending on a length type according to an embodiment of the present invention.

FIG. 5 and FIG. 6 are diagrams to explain variable bits assignment of length information for an extension signal by depending on a length type according to an embodiment of the present invention.

FIG. 5 shows a method of defining one more syntax element for defining how many bits are used for 'bsResidualSignalLength' to further reduce bit consumption. And, FIG. 6 schematically illustrates the method shown in FIG. 5. For instance, 'bsResidualSignalLengthtype' is newly defined as a length type. If a value of the 'bsResidualSignalLengthtype' is zero, four bits are assigned to the 'bsResidualSignalLength'. If a value of the 'bsResidualSignalLengthtype' is 1, eight bits are assigned to the 'bsResidualSignalLength'. If a value of the 'bsResidualSignalLengthtype' is 2, twelve bits are assigned to the 'bsResidualSignalLength'. If a value of the 'bsResidualSignalLengthtype' is 3, sixteen bits are assigned to the 'bsResidualSignalLength'. In this case, the assigned bits are exemplary. So, bits different from the above-defined bits can be assigned. To reduce the bit consumption more than those of the above methods, the method-shown in FIG. 7 and FIG. 8 is provided.

Figure 8:
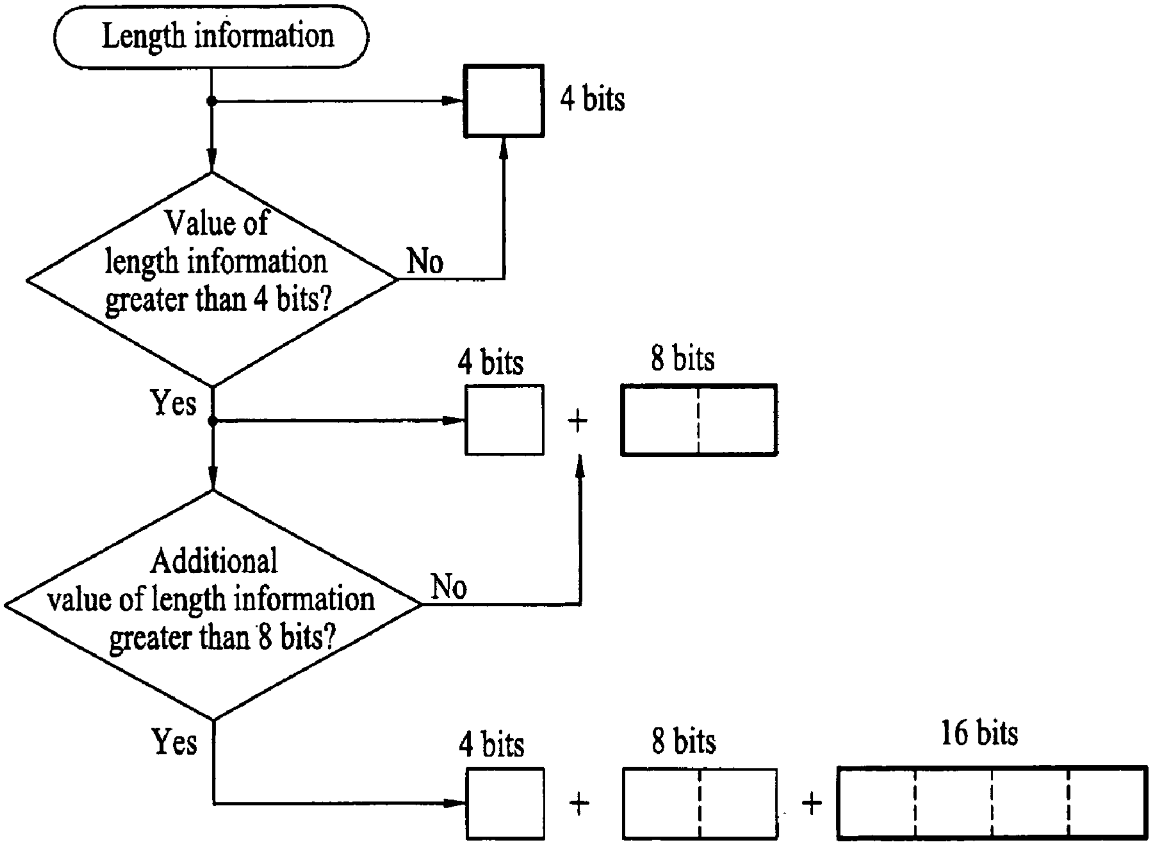

FIG. 7 and FIG. 8 are diagrams to explain adaptive bits assignment of length information for an extension signal by depending on a real length of the extension signal according to an embodiment of the present invention.

If an extension signal is inputted, a length information value of the extension signal can be read up to an initially determined value. If the length information value equals to a predetermined value, it is able to read additionally up to a further determined value. If the length information value equals to another predetermined value, it is able to read additionally up to another further determined value. In this case, if the length information value is not another predetermined value, the corresponding value is outputted as the length information value as it is. Thus, the length information of the extension signal is adaptively read according to a real data length, whereby the bit consumption can be maximally reduced. The example shown in FIG. 7 or FIG. 8 is explained.

In FIG. 7, a residual signal is taken as an example of the extension signal. If a residual signal is inputted, four bits of the residual signal length are read. If a length information value (bsResidualSignalLength) is $2^4-1$ (=15), eight bits are further read as a value of bsResidualSignalLength1. If the length information value (bsResidualSignalLength) is $(2^4-1)+(2^8-1)$ (=15+255), twelve bits are further read as a value of bsResidualSignalLength2. In the same manner, if the length information value (bsResidualSignalLength) is $(2^4-1)+(2^8-1)+(2^{12}-1)$ (=15+255+4095), sixteen bits are further read as a value of bsResidualSignalLength3.

FIG. 8 schematically illustrates another example of the adaptive bits assignment of length information for an extension signal.

In FIG. 8, if an extension signal is inputted, four bits are preferentially read. If a value resulting from reading length information is smaller than four bits, the corresponding value becomes the length information. Yet, if a value resulting from reading length information is greater than four bits, eight bits are further read in addition. If the additionally read value is smaller than eight bits, a total read length information value corresponds to 12 (=4+8). Yet, if the additionally read value is greater than eight bits, sixteen bits are further read in addition again. This is explained in detail as follows. First of all, if length information is inputted, four bits are read. A real length information value ranges 0~14. If the length information value becomes $2^4-1$ (=15), the extension signal is further read in addition. In this case, the extension signal can be additionally read up to $2^8-2$ (=254). Yet, if the length information value corresponds to a value smaller than $2^4-1$ (=15), a value of the read $0\sim(2^4-2)$ (=14) is outputted as it is. Once the length information value becomes $(2^4-1)+(2^8-1)$, the extension signal is further read in addition. In this case, the extension signal can be additionally read up to $(2^{16}-1)$ Yet, if the length information value corresponds to a value smaller than $2^{16}-1$, a value of the read $0\sim(2^{16}-1)$ (=14) is outputted as it is. In this case, as mentioned in the foregoing description, the assigned bits are exemplary for explanation. So, another bits different from the above-defined bits can be assigned.

Meanwhile, the length information of the extension signal can be length information of the extension signal header or length information of the extension signal frame data. So, the length information of the extension signal can be located in a header area and/or a frame data area. Bit stream structures for this are explained with reference to FIGS. 9 to 12.

Figure 9:
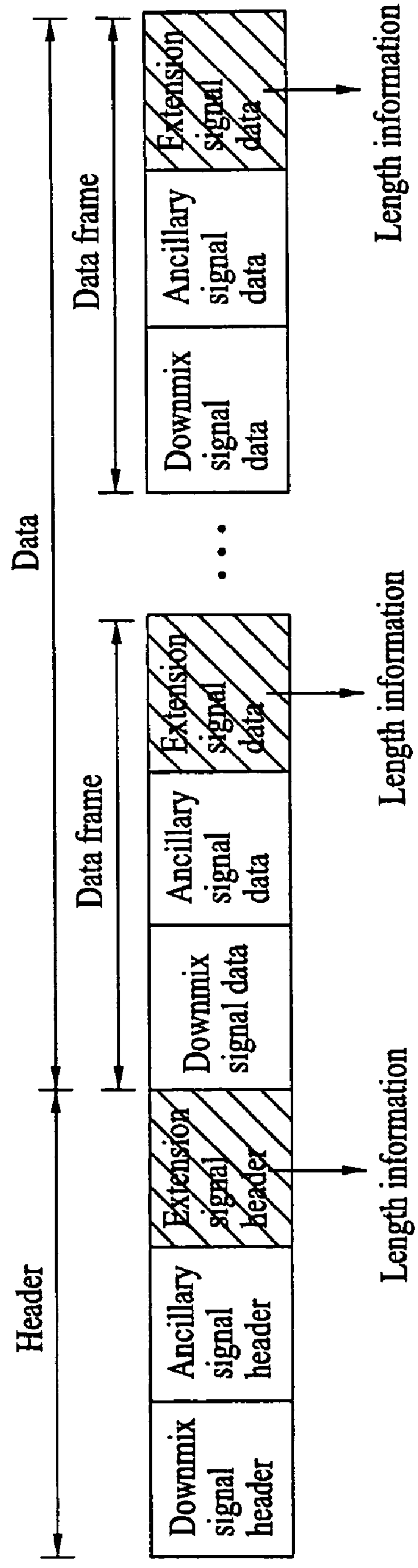
FIG. 9 is a diagram of a bit stream structure configuring an audio signal with a downmix signal, an ancillary signal, and an extension signal according to an embodiment of the present invention.
Figure 10:
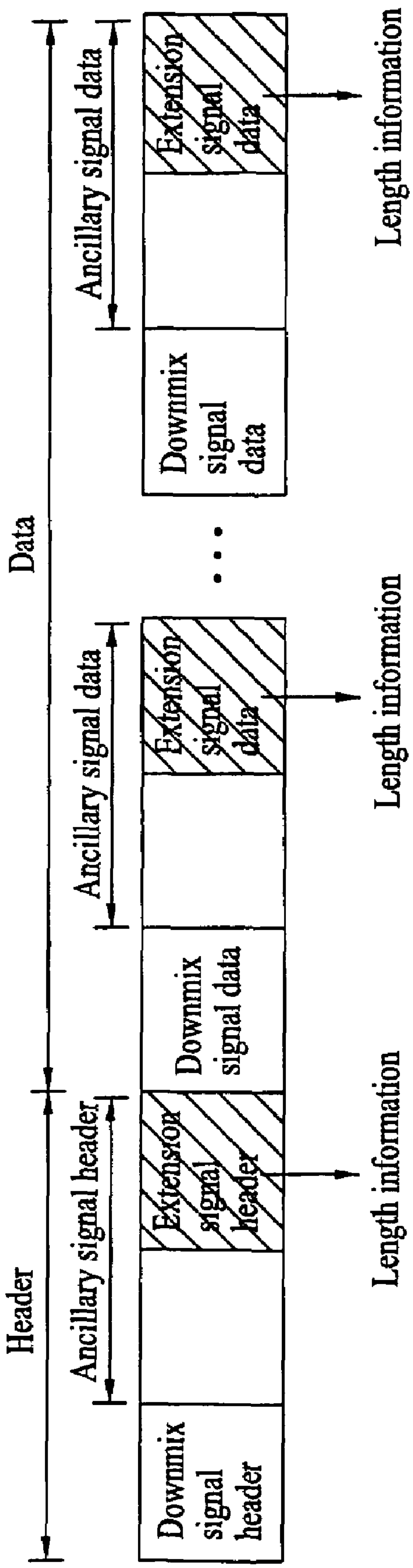
FIG. 10 is a diagram of a bit stream structure configuring an audio signal with an ancillary signal including an extension signal and a downmix signal according to an embodiment of the present invention.

FIG. 9 and FIG. 10 show embodiments of the present invention, in which a bit stream structure configuring an audio signal with a downmix signal, an ancillary signal, and an extension signal is shown.

An audio signal includes a downmix signal and an ancillary signal. As an example of the ancillary signal, a spatial information signal can be taken. Each of the downmix signal and the ancillary signal is transferred by a frame unit. The ancillary signal can include header information and data information or can include data information only. Thus, in the file/general streaming structure configuring one audio signal, the header information precedes and is followed by the data information. For instance, in case of a file/general streaming structure configuring one audio signal with a downmix signal and an ancillary signal, a downmix signal header and an ancillary signal header can exist as the header information in a front part. And, downmix signal data and ancillary signal data can configure one frame as the data information behind the front part. In this case, by defining an extension area of the ancillary data, it is able to locate an extension signal. The extension signal can be included within the ancillary signal or can be used as an independent signal. FIG. 9 shows a case that the extension signal is used as the independent signal and FIG. 10 shows a case that the extension signal is located in the extension area within the ancillary signal. So, in case that there exists the extension signal, in the file/general streaming structure, an extension signal header can exist as header information in the front part as well as the downmix header and the spatial information header. Behind the front part, extension signal data can be further included as data information as well as the downmix signal data and the ancillary signal data to configure one frame. Since the extension signal can be selectively decoded, it can be located at a last part of the frame or can consecutively exist right behind the ancillary signal. The length information explained in FIGS. 3 to 8 can exist within the header area of the extension signal and/or the data area of the extension signal. In this case, the length information existing within the header area (extension signal header) indicates the length information of the extension signal header, and the length information existing within the data area (extension signal data) indicates the length information of the extension signal data. Thus, the length information existing each of the areas is read from a bit stream and the decoding apparatus is able to skip the decoding of the extension signal based on the length information.

Figure 11:
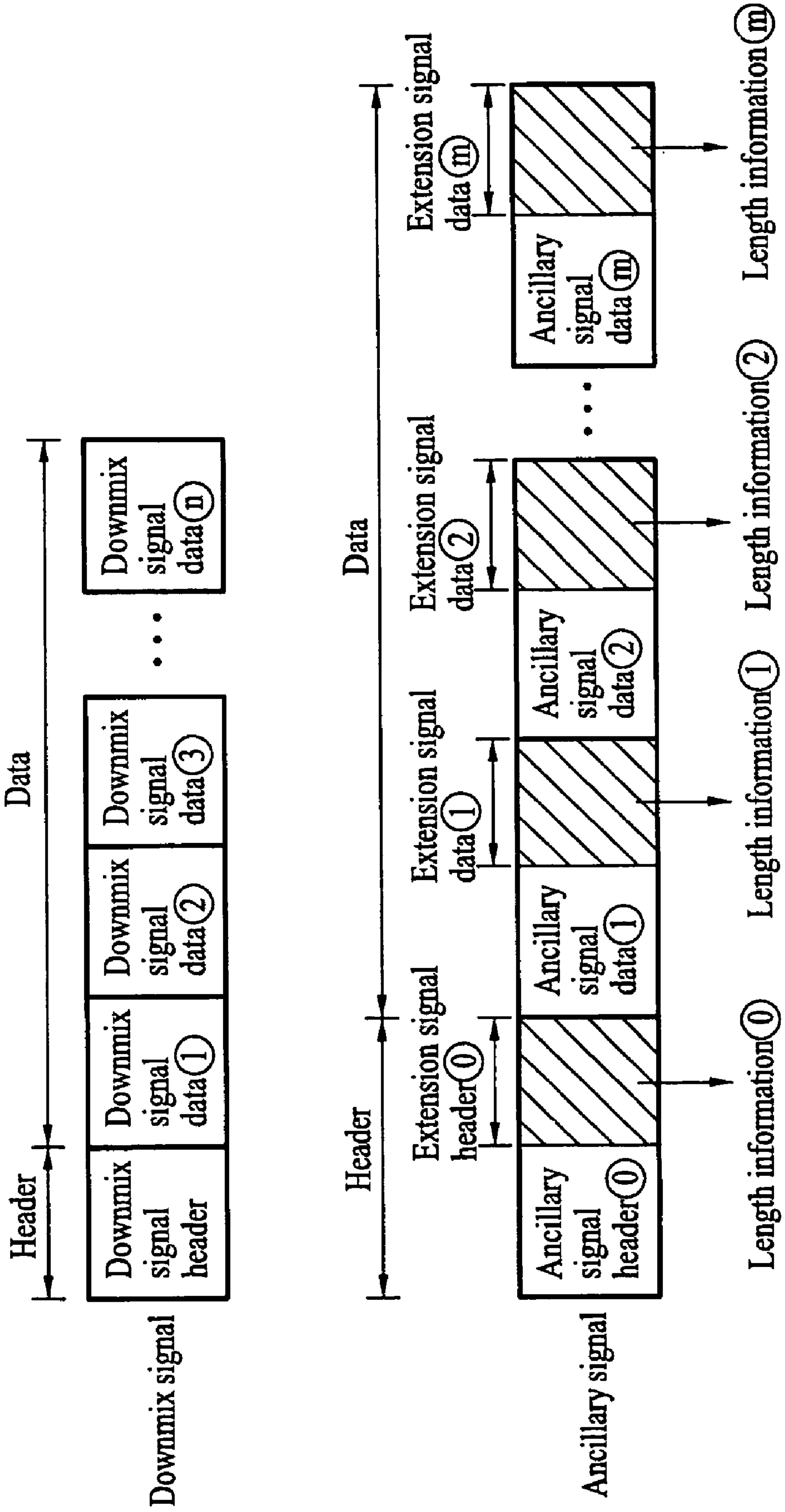
FIG. 11 is a diagram of a bit stream structure configuring an independent audio signal with a downmix signal or an ancillary signal according to an embodiment of the present invention.

FIG. 11 is a diagram of a bit stream structure configuring an independent audio signal with a downmix signal or an ancillary signal according to an embodiment of the present invention.

An audio signal includes a downmix signal and an ancillary signal. As an example of the ancillary signal, a spatial information signal can be taken. The downmix signal and the ancillary signal can be transferred as independent signals, respectively. In this case, the downmix signal has a structure that a downmix signal header (downmix signal header ⓪) as header information is located at a front part and that downmix signal datas (downmix signal data (①, ②, ③, . . . , ⓝ) as data information follow the downmix signal header. Likewise, the ancillary signal has a structure that an ancillary signal header (ancillary signal header ⓪) as header information is located at a front part and that ancillary signal datas (ancillary signal data (①, ②, . . . , ⓜ) as data information follow the ancillary signal header.

Since the extension signal can be included within the ancillary signal, a structure that the extension signal follows the ancillary signal data can be provided. So, an extension signal header ⓪ follows the ancillary signal header ⓪ and the extension signal data ① follows the ancillary signal data ①. Likewise, the extension signal data ② follows the ancillary signal data ②. In this case, length information of the extension signal can be included in each of the extension signal header ⓪, the extension signal data ①, and/or the extension signal data ②, . . . , and ⓜ.

Meanwhile, unlike the file/general streaming structure, in case that it is unable to use previously transferred header information since an audio signal is decoded from a random timing point instead of being decoded from the beginning, it is able to decode the audio signal using another header information included in the audio signal. In case of using an audio signal for broadcasting or the like or losing header information in the course of transferring an audio signal, decoding should start from any moment of receiving a signal. So, it is able to improve coding efficiency by defining identification information indicating whether the header exits. A streaming structure for broadcasting is explained with reference to FIG. 12 as follows.

Figure 12:
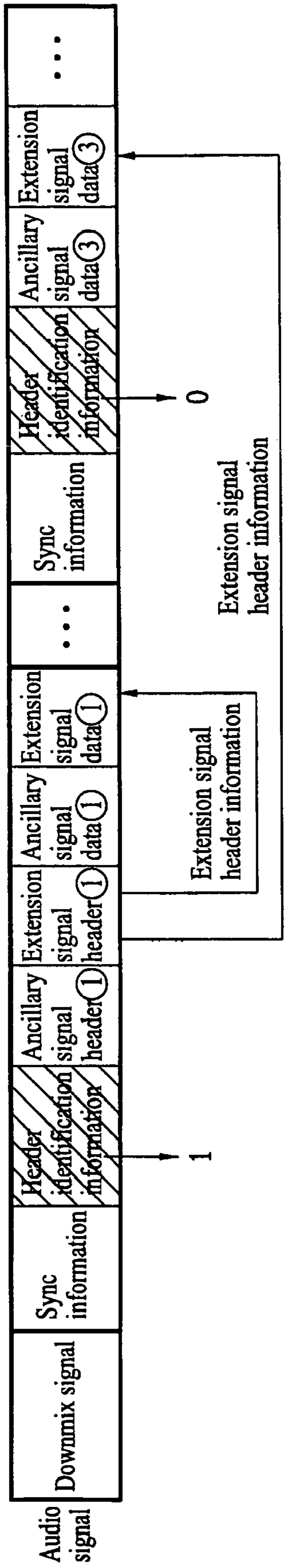
FIG. 12 is a diagram of a broadcasting streaming structure configuring an audio signal with a downmix signal and an ancillary signal according to an embodiment of the present invention.

FIG. 12 is a diagram of a broadcasting streaming structure configuring an audio signal with a downmix signal and an ancillary signal according to an embodiment of the present invention.

In case of a broadcast streaming, if header information exists in a front part of an audio signal once only, it is unable to execute decoding due to the absence of header information in case of receiving an audio signal at a random timing point. So, the header information can be inserted in the audio signal once at least. In this case, the header information can be included according to a preset format (e.g., temporal interval, spatial interval, etc.). In particular, the header information can be inserted in each frame, periodically inserted in each frame with a fixed interval, or non-periodically inserted in each frame with a random interval. Alternatively, the header information can be inserted once according to a fixed time interval (e.g., 2 seconds).

A broadcast streaming structure configuring one audio signal has a structure that at least once header information is inserted between data informations. For instance, in case of a broadcast streaming structure configuring one audio signal, a downmix signal comes first and an ancillary signal follows the downmix signal. Sync information for distinguishing between the downmix signal and the ancillary signal can be located at a front part of the ancillary signal. And, identification information indicating whether header information for the ancillary signal exists can be located. For instance, if header identification information is 0, a next read frame only has a data frame without header information. If the header identification information is 1, a next read frame has both header information and a data frame. This is applicable to the ancillary signal or the extension signal. These header informations may be the same of the header information having been initially transferred or can be variable. In case that the header information is variable, new header information is decoded and data information transferred after the new header information is then decoded according to the decoded new header information. In case that the header identification information is 0, a transferred frame only has a data frame without header information. In this case, to process the data frame, previously transferred header information can be used. For instance, if the header identification information is 1 in FIG. 12, an ancillary signal header ① and an extension signal header ① can exist. Yet, if a next incoming frame has no header information since the header identification information set to 0, it is able to use information of the extension signal header ① previously transferred to process extension signal data ③.

Figure 13:
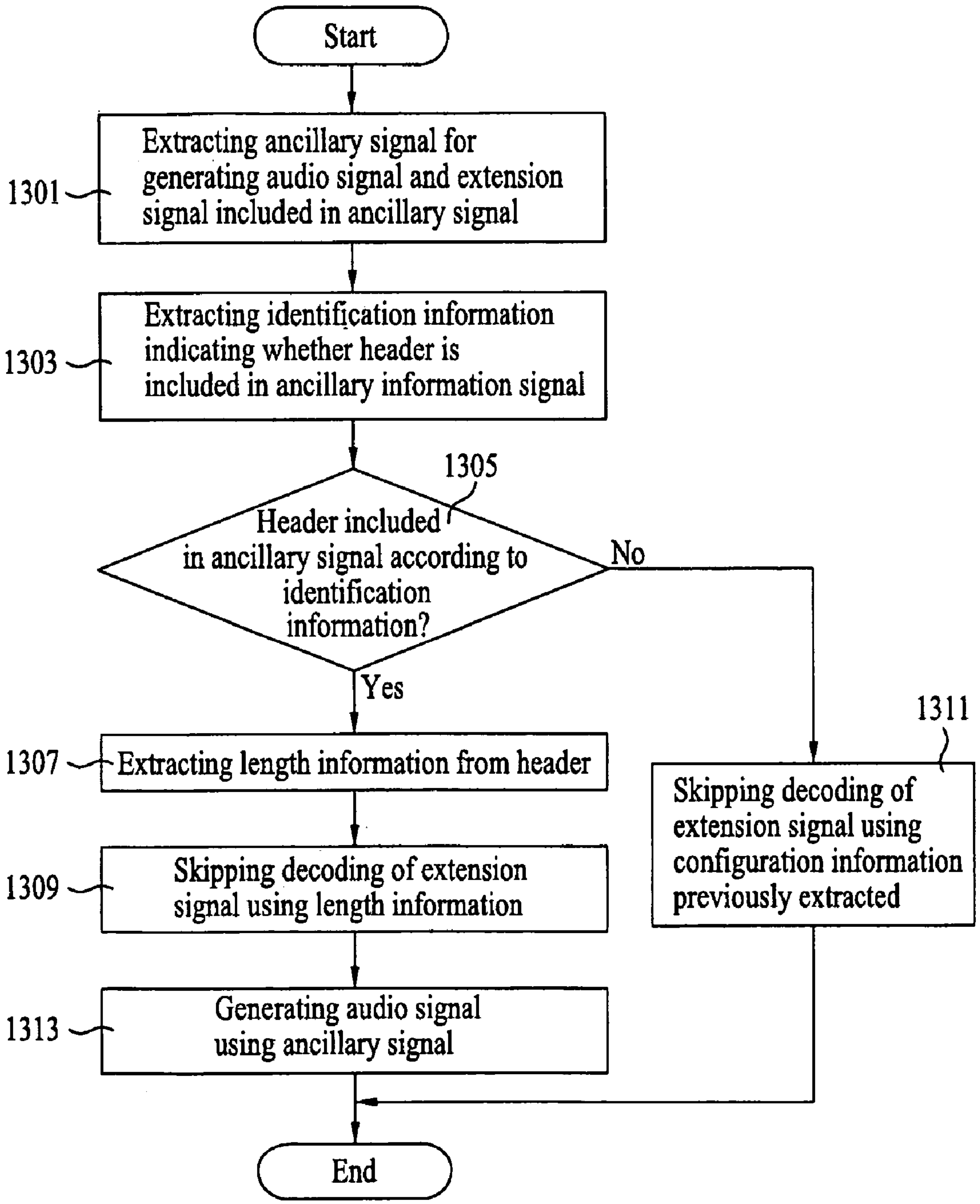
FIG. 13 is a flowchart of a method of processing an extension signal using length information of the extension signal in accordance with identification information indicating whether a header is included within an ancillary signal in case if using an audio signal for broadcasting or the like according to an embodiment of the present invention.

FIG. 13 is a flowchart of a method of processing an extension signal based on length information of the extension signal in accordance with identification information indicating whether a header is included within an ancillary signal in case of using an audio signal for broadcasting or the like according to an embodiment of the present invention.

Referring to FIG. 13, an ancillary signal for an audio signal generation and an extension signal included in the ancillary signal are extracted from a received bit stream (1301). The extension signal can be included within the ancillary signal. Identification information indicating whether a header is included in the ancillary signal is extracted (1303). For instance, if the header identification information is 1, it indicates that an ancillary signal header is included in the ancillary signal. If the header identification information is 0, it indicates that an ancillary signal header is not included in the ancillary signal. In case that the extension signal is included in the ancillary signal, if the header identification information is 1, it indicates that an extension signal header is included in the extension signal. If the header identification information is 0, it indicates that an extension signal header is not included in the extension signal. It is decided that whether a header is included in the ancillary signal according to the header identification information (1305). If the header is included in the ancillary signal, length information is extracted from the header (1307). And, it is able to skip decoding of the extension signal based on the length information (1309). In this case, the header plays a role in enabling each ancillary signal and/or each extension signal to be interpreted. For instance, the header information can include information for a residual signal, length information for a residual signal, sync information indicating a location of a residual signal, a sampling frequency, a frame length, the number of a parameter band, tree information, quantization mode information, ICC (interchannel correlation), parameter smoothing information, gain information for a clipping-prevention, QMF (quadrature mirror filter) associated information, etc. Moreover, if the header is not included in the ancillary signal according to the header identification information, it is able to skip decoding of the extension signal based on the previously extracted length information for the header (1311).

Figure 14:
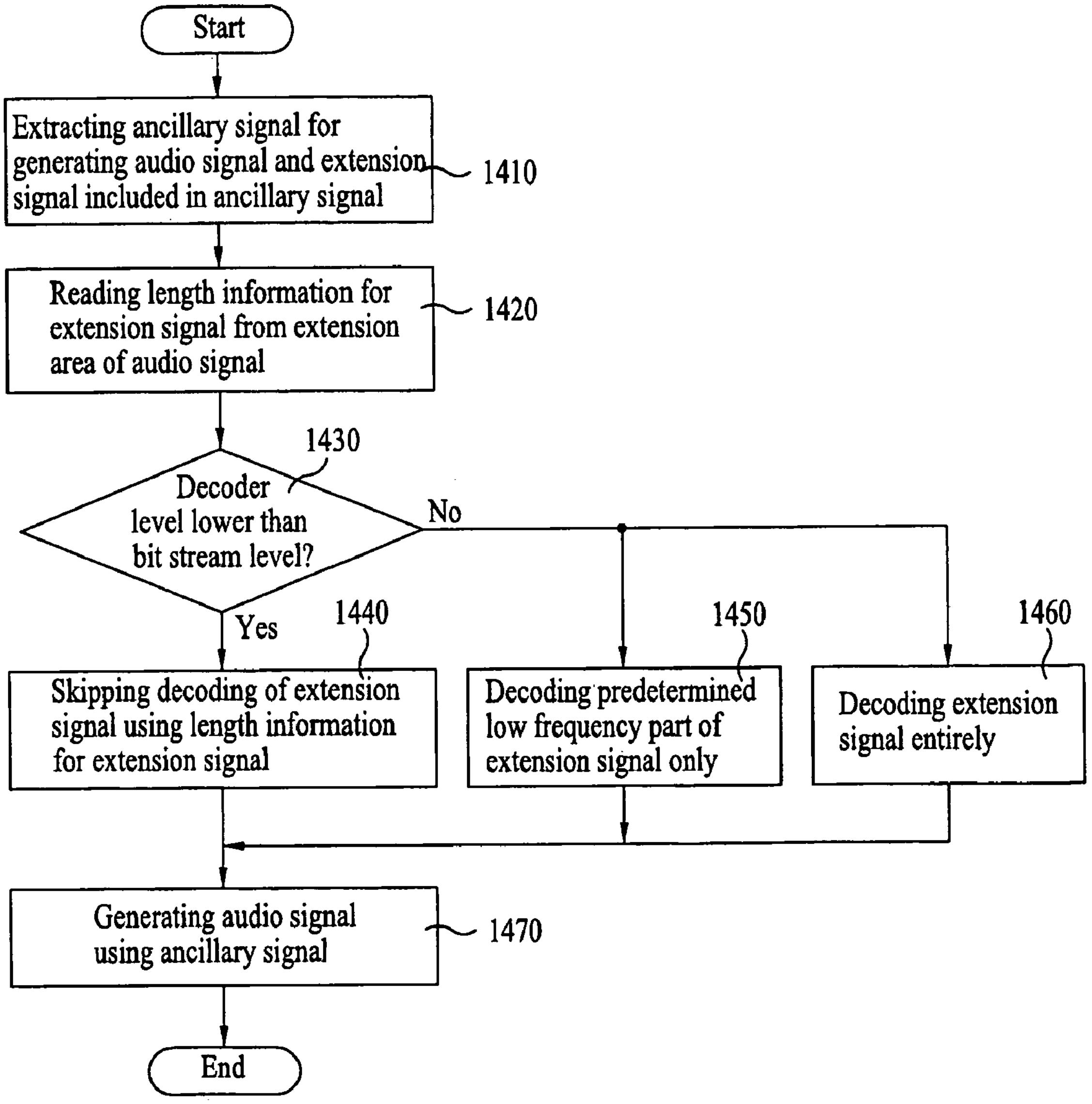
FIG. 14 is a flowchart of a method of decoding an extension signal selectively using length information of the extension signal in accordance with a level of a bit stream according to an embodiment of the present invention.

FIG. 14 is a flowchart of a method of decoding an extension signal selectively based on length information of the extension signal according to an embodiment of the present invention.

A profile means that technical elements for algorithm in a coding process are standardized. In particular, the profile is a set of technical elements necessary to decode a bit stream and corresponds to a sort of a sub-standard. A level defines a range of the technical elements, which are prescribed in the profile, to be supported. In particular, the level plays a role in defining capability of a decoding apparatus and complexity of a bit stream. In the present invention, level information can include definitions for the profile and level. A decoding method of an extension signal can selectively vary according to the level information of the bit stream and the level information of the decoding apparatus. For instance, even if the extension signal exists in a transferred audio signal, decoding of the extension signal may be or may not be executed as a result of deciding the level information. Moreover, although the decoding is executed, a predetermined low frequency part can be used only. Besides, it is able to skip the decoding of the extension signal as many as length information of the extension signal in order not to execute the decoding of the extension signal. Alternatively, although the extension signal is entirely read, the decoding cannot be executed. Furthermore, a portion of the extension signal is read, decoding can be performed on the read portion only, and the decoding cannot be performed on the rest of the extension signal. Alternatively, the extension signal is entirely read, a portion of the extension signal can be decoded, and the rest of the extension signal cannot be decoded.

For instance, referring to FIG. 14, an ancillary signal for generating an audio signal and an extension signal included in the ancillary signal can be extracted from a received bit stream (1410). And, information for the extension signal can be extracted. In this case, the information for the extension signal may include extension data type information indicating a data type of the extension signal. For instance, the extension data type information includes residual coding data, artistic downmix residual coding data, artistic tree extension data, or the like. So, the type of the extension signal is decided and it is able to read length information of the extension signal from an extension area of the audio signal (1420). Subsequently, a level of the bit stream is decided. This can be decided with reference to following information. For instance, if the type of the extension signal is the residual coding data, the level information for the bit stream can include the number of output channels, a sampling rate, a bandwidth of a residual signal, and the like. So, if the above-explained level informations of the bit stream are inputted, they are compared to level information for a decoding apparatus to decide whether the extension signal will be decoded (1430). In this case, a level of the decoding apparatus can be previously set. In general, the level of the decoding apparatus should be equal to or greater than a level of the audio signal. This is because the decoding apparatus should be able to decode the transferred audio signal entirely. Yet, in case that limitation is put on the decoding apparatus (e.g., in case that the level of the decoding apparatus is smaller than that of the audio signal), decoding is occasionally possible. Yet, a corresponding quality may be degraded. For instance, if the level of the decoding apparatus is lower than that of the audio signal, the decoding apparatus may be unable to decode the audio signal. Yet, in some cases, the audio signal can be decoded based on the level of the decoding apparatus.

In case that the level of the decoding apparatus is decided lower than that of the bit stream, it is able to skip the decoding of the extension signal based on the length information of the extension signal (1440). On the other hand, in case that the level of the decoding apparatus is equal to or higher than that of the bit stream, it is able to execute the decoding of the extension signal (1460). Yet, although the decoding of the extension signal is executed, the decoding can be performed on a predetermined low frequency portion of the extension signal only (1450). For instance, there is a case that since the decoding apparatus is a low power decoder, if the extension signal is entirely decoded, efficiency is degraded, or since the decoding apparatus is unable to decode the entire extension signal a predetermined low frequency portion of the extension signal is usable. And, this is possible if the level of the bit stream or the level of the decoding apparatus meets a prescribed condition only.

INDUSTRIAL APPLICABILITY

Accordingly, various environments for encoding and decoding signals exist in general and there can exist various methods of processing signals according to the various environment conditions. In the present invention, a method of processing an audio signal is taken as an example, which does not restrict the scope of the present invention. In this case, the signals include audio signals and/or video signals.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for processing an audio signal, comprising:

receiving an audio signal including a downmix signal, and a bitstream including an ancillary signal and an extension signal, the downmix signal being generated from downmixing a multi-channel audio signal, the extension signal being included in an extension area within the ancillary signal, and the ancillary signal and the extension signal being for generating the multi-channel audio signal;

acquiring extension signal type information indicating a type of the extension signal;

acquiring first length information of the extension signal;

acquiring second length information of the extension signal based on the first length information and first reference value;

when the extension signal type information indicates that the extension signal is a residual signal, skipping decoding of the residual signal based on third length information of the extension signal; and generating the multi-channel audio signal by applying the ancillary signal to the downmix signal, wherein the first reference value is based on a bit assigned to the first length information, and wherein the third length information of the extension signal is obtained by adding the first length information to the second length information.

2. The method of claim 1, further comprising:

acquiring fourth length information of the extension signal based on the second length information and a second reference value, wherein the second reference value is based on a bit assigned to the second length information and the first reference value, the third length information of the extension signal being the sum of the first length information, the second length information and the fourth length information.

3. The method of claim 1, wherein the ancillary signal includes a spatial parameter for generating a multi-channel audio signal, the spatial parameter including information representing an energy difference between channels, information representing a correlation between channels, and channel prediction coefficient information.

4. The method of claim 1, wherein the length information of the extension signal is assigned as a fixed bit.

5. The method of claim 1, wherein the length information of the extension signal is assigned as a variable bit based on length type information of the extension signal.

6. The method of claim 1, wherein the length information of the extension signal is assigned as an adaptive bit based on a length of the extension signal.

7. A method of processing an audio signal, comprising:

receiving an audio signal including a downmix signal, and a bitstream including an ancillary signal and an extension signal, the downmix signal being generated from downmixing a multi-channel audio signal, the extension signal being included in an extension area within the ancillary signal, and the ancillary signal and the extension signal being for generating the multi-channel audio signal;

acquiring extension signal type information indicating a type of the extension signal;

acquiring sync information indicating a location of the ancillary signal and a location of the extension signal;

when the extension signal type information indicates that the extension signal is a residual signal, skipping decoding of the residual signal based on the sync information, and generating the multi-channel audio signal by applying the ancillary signal to the downmix signal.

8. The method of claim 7, wherein the sync information indicates a starting location and an ending location of the extension signal.

9. An apparatus for processing an audio signal, comprising:

a demultiplexing unit receiving an audio signal including a downmix signal, and a bitstream including an ancillary signal and an extension signal, the downmix signal being generated from downmixing a multi-channel audio signal, the extension signal being included in an extension area within the ancillary signal, and the ancillary signal and the extension signal being for generating the multi-channel audio signal;

an extension signal type information acquiring unit acquiring extension signal type information, the extension signal type information indicating a type of the extension signal;

an extension signal length reading unit acquiring first length information of the extension signal, and acquiring second length information of the extension signal based on the first length information and a first reference value;

a selective decoding unit skipping decoding of a residual signal based on third length information of the extension signal when the extension signal type information indicates that the extension signal is the residual signal; and an upmixing unit generating the multi-channel audio signal by applying the ancillary signal to the downmix signal, wherein the first reference value is based on a bit assigned to the first length information, and wherein the third length information of the extension signal is obtained by adding the first length information to the second length information.

10. An apparatus for processing an audio signal, comprising:

a demultiplexing unit receiving an audio signal including a downmix signal, and a bitstream including an ancillary signal and an extension signal, the downmix signal being generated from downmixing a multi-channel audio signal, the extension signal being included in an extension area within the ancillary signal, and the ancillary signal and the extension signal being for generating the multi-channel audio signal;

an extension signal type information acquiring unit acquiring extension signal type information, the extension signal type information indicating a type of the extension signal;

a sync information acquiring unit acquiring sync information indicating a location of the ancillary signal and a location of the extension signal;

a selective decoding unit skipping decoding of a residual signal based on the sync information when the extension signal type information indicates that the extension signal is the residual signal; and an upmixing unit generating the multi-channel audio signal by applying the ancillary signal to the downmix signal.

* * * * *